United States Patent [19]
Hondrea

[11] 3,782,626
[45] Jan. 1, 1974

[54] SLIDE RULE WITH IMPROVED CALCULATING CAPACITY

[75] Inventor: Iosif Hondrea, Rimisoara, Romania

[73] Assignee: Iprofil "Technolemn"-Industria Produselor Finite Din Lemn Timisoara, Noembrie, Romania

[22] Filed: June 21, 1971

[21] Appl. No.: 154,745

[52] U.S. Cl. .............................. 235/70 R, 235/70 C
[51] Int. Cl. ................................................ G06g 1/02
[58] Field of Search ............... 235/70 A, 70 C, 70 R

[56] References Cited
UNITED STATES PATENTS

| | | | |
|---|---|---|---|
| 2,500,460 | 3/1950 | Hunt | 235/70 R |
| 1,168,059 | 1/1916 | Cuntz | 235/70 R |

OTHER PUBLICATIONS

"Directions for the Use of Roylance Electrical Slide Rule", Keuffel & Esser Co., N.Y., 1924.

"IBM Technical Disclosure Bulletin", Vol. 11, No. 11, p. 1563, 1564, April, 1969.

Primary Examiner—Richard B. Wilkinson
Assistant Examiner—John F. Gonzales
Attorney—Karl F. Ross

[57] ABSTRACT

A slide rule with improved calculating capacity has, in addition to the A, B, C, D and related scales, a folded square scale BF whose origin $\pi$ coincides with the left-hand indices 1 of the previously mentioned scales and which runs to the value 36 on the slider. The balance of the length of the slider is provided with a centesimal trigonometric scale.

8 Claims, 3 Drawing Figures

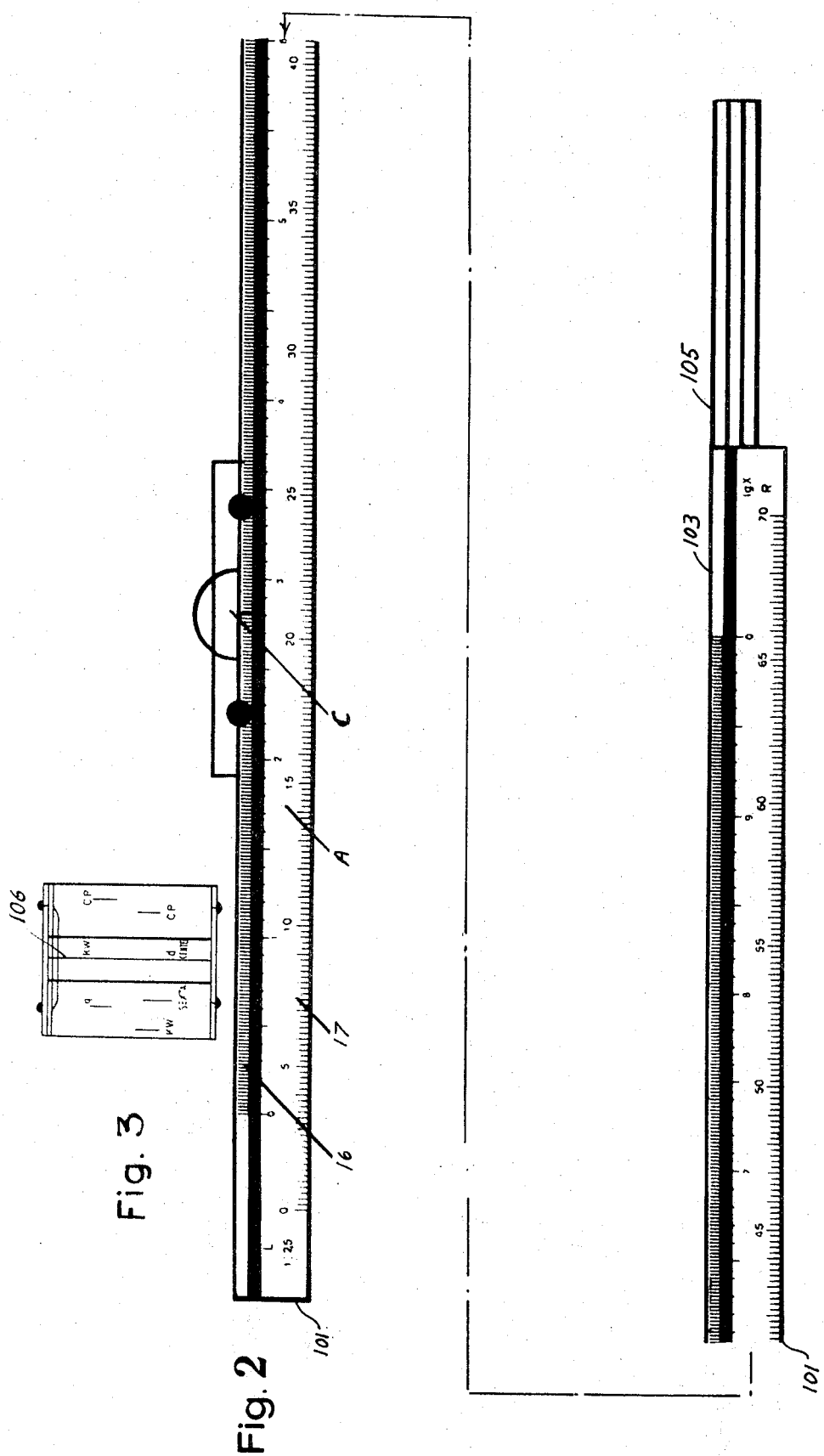

SLIDE RULE WITH IMPROVED CALCULATING CAPACITY

FIELD OF THE INVENTION

My present invention relates to a general purpose calculating instrument and, more particularly, to a slide rule with improved calculating capacity and facility of operation.

BACKGROUND OF THE INVENTION

Slide rules have gained increasing prominence as a calculating means because of their ease in handling, carrying facility and versatility. In general, the most commonly used slide rules are circular and linear rules having a rule body marked with certain scales, a slide shiftable within a groove or channel of the rule body and marked with other cooperating scales, and a cursor or slide shiftable along the body of the rule and being transparent over at least a window to permit the viewing of the scales therebeneath. A reticle or hairline is provided on the window, with or without a magnifying lens, to permit selection of a value for manipulating on the scale below.

In practice, the slide rule may have a length of, say, 125 mm (pocket size), a length of 250 mm (normal size) or, say, 1,000 mm (extra long) with increasing accuracy and precision. A slide rule is frequently capable of calculations with three or four significant figures, the variety of calculations being limited only by the number of scales available. It is not uncommon, therefore, for the slide rule to be provided with scales necessary for ordinary or usual calculations, with scales required for calculations which arise infrequently but are desirable for special purposes (special-purpose scales), and with indices or markings representing relationships, constants and values which arise frequently in specialized or general calculation. Typical of such special indices or markings are those at the magnitude $e = 2.718$ and corresponding to the natural logarithm base, $\pi$ or multiples thereof, etc.

The slide rule may have its versatility increased by adding scales or special markings as already noted, by increased fineness of the subdivision of the scale, and by the provision of scales of extra length. The latter case has the disadvantage that, with increasing length, the slide rule may become unwieldy and difficult to manipulate.

A conventional general purpose slide rule may have, along the face of the longitudinally extending slide, a basic logarithmically divided base-valve scale C representing the numerical value X and cooperating with the base-valve D scale of identical subdivision on the slide-rule body. On the body, moreover, there is commonly provided a logarithmically divided square A scale representing the value $X^2$, where X is selected by means of the hairline on the D scale, and a squaring scale B subdivided identically to scale A is formed on the slide to cooperate with scale A. These are the basic scales for multiplication, division, squaring, extraction of square roots and for simple or complex ratio solutions. Apart from these basic scales, scales of less than general purpose, but greater utility than the highly specialized scales mentioned earlier, are usually provided. These scales are designed to assist in calculations affecting a large portion of the scientific, mathematical and engineering community. These scales include a logarithmically devided K (cube) scale representing the value $X^3$, when X is selected by the hairline of the cursor along either the C or D scale. Other scales of intermediate utility are logarithmically divided reciprocal scales CI and/or DI, respectively, representing the values $1/X$, where X is selected by moving the hairline to the appropriate value on the C or D scale respectively, the reciprocal square scales AI and BI, representing the values of $1/X^2$, and other scales corresponding to $10/X$, $100/X^2$ etc. Another scale finding significant utility is the L scale representing the mantissa of the common logarithm (base 10) of a number on the C or D scale; hence the L scale represents the value log X and is decimally subdivided along the rule, whereas each of the other scales mentioned earlier is logarithmically subdivided. It is also not uncommon to provide a P scale of the Pythagorean relationship $\sqrt{1-X^2}$, scales for the trigonometric functions sine, cosine, tangent or cotangent in 60-division (sexagesimal) units or other wise, and so-called log-log scales LL01, LL1, LL02, LL2, LL03, LL3 ... representing positive and negative exponents of the natural logarithm base $e$.

In addition, the specialized scales may be provided for certain mathematical, technical, commercial, banking or financial purposes, or even for the more specialized subjects of science and technology, namely electrical technology, mechanical engineering, chemistry, reinforced concrete, printing topographical activities, telecommunication, automotive racing, navigation and aeronautics.

OBJECTS OF THE INVENTION

It is the principal object of the present invention to provide an improved slide rule with some or all of the conventional scales previously described, but with increased versatility.

It is another object of this invention to provide an improved slide rule in which the versatility can be increased without eliminating essential scales or interfering with the readability or other desired features now present on such conventional rules.

SUMMARY OF THE INVENTION

These objects and others which will become apparent hereinafter are attained, in accordance with the present invention, with a circular or elongated (linear) slide rule having the usual rule body with at least one scale face, a slide received in this body and shiftable relatively thereto while being provided with a slide face substantially coplanar with the scale face of the rule body, and a cursor provided with a reticle or hairline adapted to sweep across the faces, the body face being provided with at least the A and D scales mentioned earlier while the slide is provided with at least the B and C scales such that the scales extend across the entire effective length of the rule and have alignable indices or origins at least at one portion of the scale and preferably at the left-hand end thereof when the scale is of the linear type. I have found that the versatility of such a scale may be markedly increased for almost general applicability, by providing it with a further scale represented as BF and constituting a "folded" form of the B scale offset from the common B scale by the value $\pi$. In other words, the BF scale has the index $\pi$ and, as illustrated, with logarithmic subdivision disposed in line with the indices 1 (the origins) of the A, B, C and D scales, at least in the normal position of the slide. The BF scale, according to the present invention, is provided upon the slide for co-operation with the $X^2$ scales A and B or with the X scales C and D, and itself represents the value $\pi X^2$. However, the BF scale does not extend over the full length of the other scales, but terminates at a numerical value of about 36 so that beyond the BF scale and in line therewith I provide a further calculating scale, e.g. a scale IC of centesimal trigonometric values.

It has also been found to be advantageous in conjunction with the use of provision of the BF scale, to supply certain indices, marks or highlighted points to facilitate calculation. For example, I provide an index $W_z$ to indicate the value 2.17 on the basic scales C and D to allow the diameters of full circular sections to be set rapidly and allowing a direct reading on the cube scale K of the axial resistance modulus of bending. Conversely, using this index, one can calculate the diameter of the section by introducing the value of the modulus at the K scale.

Still another feature of the invention resides in the provision of an index $W_p$ on the basic C and D scales, or one of them (proferably the C scale) to indicate the value 1.72 thereby allowing the diameter of solid circular sections to be set on the K scale and the polar resistance modulus to be directly read out.

DESCRIPTION OF THE DRAWING

The above and other objects, features and advantages of the present invention will become more readily apparent from the following description reference being made to the accompanying drawing in which:

FIG. 2 is a longitudinal side view thereof; and

FIG. 3 is an elevational view of the slider removed from the rule.

SPECIFIC DESCRIPTION

Figure 1:
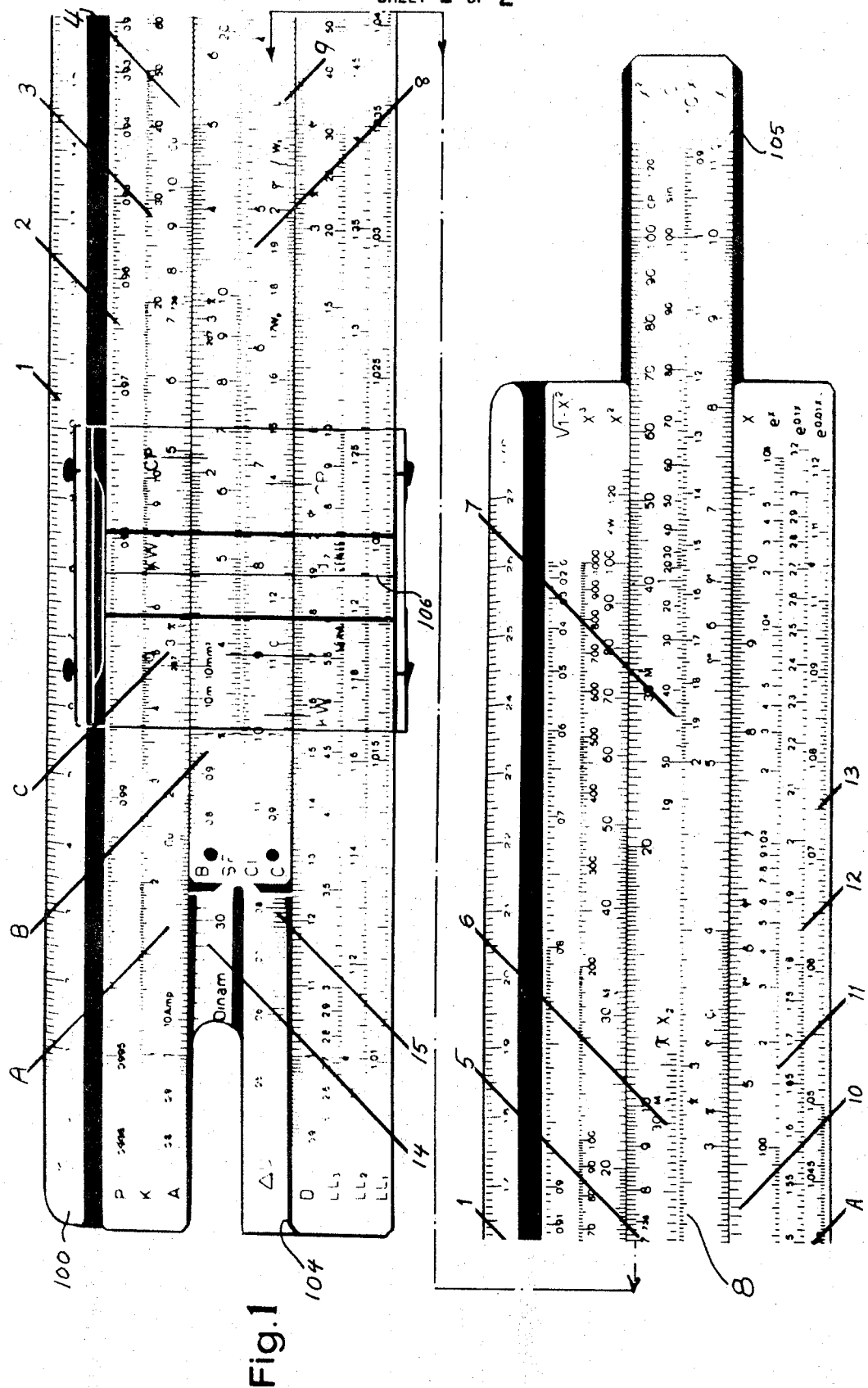
FIG. 1 is a plan view of the slide rule of the present invention as seen along its face.

In FIGS. 1 – 3, I show a slide rule which comprises a body A, a slide B and a slider or cursor C, all of which can be shifted longitudinally relative to one another. The rule body A comprises a wood core of trapezoidal cross section having an inclined flannk 100, a perpendicular flank 101, a rear face 102 and an upper surface 103. The channel 104 is provided with walls in which the tongues 105 of the slide B are received. Appropriate grooves are also provided to guide the cursor C which has a hairline or reticle 106. The body is faced with milk-white celluloid provided with the various scales and may be reinforced with brass armatures extending longitudinal and cross springs of steel in a U configuration as is conventional in the art.

The slide rule is formed with a millimeeter scale 1 along the beveled flank of the trapezoid for measuring and design layout and as a matter of convenience. Under certain conditions, described in my commonly owned copending application Ser. No. 154,744 filed June 21, 1971, this scale can be constituted as an L scale for indicating mantissae of the common logarithms of a number selected on the C or D scale, or for allowing the number to be determined when the mantissa is known. Along the upper edge of the face of the rule body A, I provide a scale P of the pythagorean values $\sqrt{1-X^2}$ and below the scale, the scale K of cubic values $X^3$ designated at 3. A scale 4 is located along the lower edge of the upper strip of the face of the scale body and constitutes the basic square scale A representing the value $X^2$.

Along the upper border of the lower strip of the scale body, there is provided the base-value D scale at 10 such that a number selected on the D scale corresponds to the square of this number on the A scale. A scale 11 directly below the D scale represents LL1 and the value $e^X$ and is followed by scale 12 and 13 corresponding to LL2 and LL3 and representing the values $e^{0.1X}$ and $e^{0.01X}$. Along the right-angle flank of the rule body, there is provided at 17 a scale R establishing the ratio 1:2.5 and the purpose of which will be apparent hereinafter. Above the scale, on the edge of the rule body, there is provided the decimally subdivided scale 16 corresponding to a conventional L scale and representing the mantissa of the values log X.

The slide is provided along its upper edge with a square scale B identical in all respects with the scale A and indicating the value $X^2$ when the hairline 106 is applied to a value X on the C scale discussed in detail hereinafter. Scale B is designated by the reference numeral 5. Similarly, along the lower edge of one face of the slide B, I provide the base-value C scale which corresponds identically to the scale D and cooperates therewith for ordinary multiplication and division. This scale 9 indicates the value X. Immediately above the latter scale is an inverted or reciprocal scale CI corresponding to the reciprocal of the C scale multiplied by 10 and therefore representing the ratio 10:X, this scale being designated at 8.

According to the present invention, a scale 6 is provided in the form of a folded B scale represented by the designation BF and with an origin set at $\pi$ and extending to the value 36 or at least to the value $10\pi$ such that this scale represents the product $\pi X^2$ for a number X indicated on the C scale number $X^2$ of the B scale (see example 7 (a) infra). Since this scale BF only extends over a portion of the length of the slide B, the balance is provided with a scale 7 (IC) representing centesimal trigono-metric scales having a black portion representing arc sine or arc cosine and a red inverse section representing the arc tangent or arc cotangent.

Along the reverse side of the slider B are provided trigonometric scales including a scale S, of the sexagesimal trigonometric arc sines and arc cosines in terms of sine 0.1X and cosine 0.1X for large angles, a scale designated ST of the arc sines, arc tangents and angles of arc for values corresponding to 0.01X and a scale T, for the sexagesimal trigonometric arc tangents or arc cotangents (tangent 0.1X, contangent 0.1X) for large angles.

In the floor of the channel 104 in which the slider is received, I provide scales 14 and 15, the first being a doubly colored scale of efficiencies such that the black left-hand side is marked PINAM to indicate the efficiency of electromagnetic dynamos, while a red scale on the right-hand side is marked ELMOT representing the efficiency of electric motors. The DINAM scale extends between $\eta = 20\%$ and $\eta = 100\%$ while the reciprocal ELMOT scale runs from $\eta = 100\%$ to $\eta = 20\%$. The lower scale 15 on the floor of the scale is represented as a $\Delta U$-scale of voltage drop subdivided between 0.5 and 10 volts.

To facilitate use of the device, various indices are marked on the rule including the following:

a. the right-hand and left-hand indices 1 of the basic C and D scales which correspond or are aligned with the indices 1 of the A and B scales, the index 10 of the CI scale, the index $\pi$ of the BF scale, the index $o$ of the L scale and the index 1 of the K scale.

b. Indices $W_p$ and $W_z$, newly applied according to the invention and representing the value 2.17 and 1.72 on the C scale as already described. These scales are described in greater detail below. $W_z = \pi d^3/32 = (d/2.17)^3 = 2.17$ $W_p = \pi d^3/16 = (d/1.72)^3 = 1.72$ c. An index $c$ on the C scale of the slide B at the point corresponding to the value of the $\sqrt{4/\pi}$.

e. Indices $\rho^o, \rho', \rho''$ and $\rho^g$ on the slide scale C representing the radian values $180/\rho \times 57.32$, $(180 = 60)/\pi = 3437.7$, $(180 \times 60)/\pi = 206264.81$ and $200/\pi = 63.694$.

f. An index L on the scale C marked at the value log $e = 2.303$.

g. Indices $\pi$ for the scales A, B, BF, C, CI and D marked at the value 3.1416 thereof.

h. An index Cu based upon the relationship $R = \rho_{Cu} \times 1/A$ marked on the A scale and corresponding to the value 1.785. This index allows calculation of electrical resistance of copper conductors with a full circular cross section.

i. An index Cu marked in red on the scale A, to contrast with the black scale discussed immediately at (h) and based upon the relationship $G = \gamma_{Cu} \times 1 \times A$. This mark, at the value value 11.22 facilitates calculation of the weight of a copper conductor of solid cross section.

j. Indices "736" on the scales A and B representing the ratio of horsepower to kilowatts (0.736).

k. An index M on the B scale representing the value $100/\pi = 31.831$.

l. Indices "287" on scales A and B representing the value 28.7 corresponding to half the conductivity of copper.

m. Indices at the ends of the A and B scales marked at the value 78.5 and based upon the relationship $\pi/4 = 0.785$.

n. Indices $e$ at the value 2.7183 for the origin of exponential LL3 and at the end of exponential scale LL2.

o. An index $q$ on the cursor C adapted to ride along scale A and marked to the left of the reticle 106 at a distance therefrom $= \sqrt{4/\pi} = 1.1284$ corresponding to the scale of square values.

p. Indices KW located at the hairline and a location offset therefrom by a distance which will be described hereinafter, the hairline index KW being disposed at the scale A while the offset index KW is disposed along the D scale.

q. Two indices CP on the right-hand side of the window of the cursor adapted to ride along scale A and scale D respectively and corresponding to the relationships HP/0.736 and HP/1.35964 on these scales as measured from the hairline. The hairline for the index HP at the level of scale D is marked to the right of the hairline by a distance equal to that of the index $q$ to the left thereof.

r. An index SEXA on the cursor to the left of the hairline with an index mark lying along scale D and at a distance from the hairline, as measured on this scale corresponding to log 10 − log 9 = 0.04576.

s. An index CENTE on the cursor at the level of scale D.

t. An index $d$ on the cursor reading along the D scale.

The reverse side of the rule body is provided with tables D of data and engineering and technical constants.

OPERATION a. In order to find the perimeter of a circle with the diameter $d = 1.4$ m the hairline of the cursor is set on the division of the scale of squares B of the slider and, along the same hairline, beneath, at the scale BF the perimeter 4.398 m may be read, without any calculations or movement anew of the cursor or the slider.

b. In order to find the diameter of a circle with the perimeter $p = 6.6$ the hairline of the cursor is fixed at the division 6.6 on the scale BF, and the diameter 2.108 m may be read directly at the same hairline on the scale B of the slider. c. In order to find the value of $\pi d^2$, when $d = 12$ cm, the hairline of the cursor is fixed on the basic scale C of the slider at the division 12, and at the same hairline, on the scale BF the result 452.4 cm may be read, without any calculation or displacement of the slider.

d. In order to find out the value of the same relation when the diameter is greater than 3.16 ; 31.6 ; 316 etc. for example when $d = 3.5$ cm the slider is displaced to the right, bringing the origin index 1 of the scale B of the slider over the division 10 of the scale A; then, with the hiarline of the cursor, the diameter 3.5 is set on the basic scale C and the result 38.48 cm is to be read directly on the scale BF without any calculation.

e. Many values for quantities expressed in units in the composition of which are the time-second, the sexagesimal degree-second, the day approximated as the 360th part of a year can be converted in a simple way into values in such units as hours, sexagesimal degree, years and vice-versa. The same counts for other conversions, in which the ratio 1:36 or its inverse appears, which are frequent in physics and in technology. For such transformations the slider is moved to the left, bringing the end division 36 of the BF scale against the division 10 of the scale A; the given values and those sought are face-to-face on these scales and the results are obtained without any calculations, only by moving the cursor.

f. In order to transform 0.25 kWh into Joules, the reticle of the cursor is set on the scale A at the division 25 and below it on the scale BF at the hairline the value 9 is directly read; the result is 900,000 Joule.

g. To transform 5.2° into sexagesimal seconds, the hairline of the cursor is set along the scale A the division 5.2 and beneath, on the scale BF of the slider, at the hairline the value 1,872 is directly read; the result is 18,720".

h. To express 1.5 hours in seconds, the hairline of the cursor is set on the scale A at the division 1.5 and beneath, on the scale BF of the slider at the hairline, the value 5.4 is directly read; the result is 5,400 seconds.

i. In order to express 21 days in years, the hairline of the cursor is set on the scale BF of the slider at the division 21, and above, on the scale A, at the hairline, 583 is directly read, the result being 0.0583 year.

j. In order to determine how many Ohms is the inductive reactance of an electric alternating-current circuit with a frequency of 50Hz and an inductance of 16mH, the hairline of the cursor is set on the scale B at the division 1.6 and beneath, on the scale BF, with the same hairline the result $5\Omega$ is read, without any calculation or movement of the slider.

k. To find the number of Ohms constituting the capacitive reactanceof an alternating current with a frequency of 50Hz, having a capacitance of 1.15$\mu$F, the hairline of the cursor is set on the basic inverse red scale CI of the slider at the division 1.15 and beneath, on scale C of the slider an intermediate value 8.7 is read; moving the cursor to the left, the division 8.7 is set with the hairline on the scale BF, and directly above, at the hairline on the scale B, the value 277 is read; the result is $0.0000277\Omega$.

1. A way to resolve the former Example (k) in the particular case in which the frequency is different from 50Hz is as follows: In order to determine the number of Ohms constituting the capacitive reactance of analternating current with a frequency of 60Hz having a capacitance of $1.15\mu F$, the hairline of the cursor is set on the basic red inverse scale CI at the division 1.15; beneath, on the basic scale C, an intermediate value 8.7 is read at the hairline; moving the cursor to the left, on the scale A the division 120 is fixed, representing the double frequency in Hz; the slider is then pushed to the left, bringing the division 8.7 of the scale BF to the hairline, and at the beginning of the division, 1, of the square-scale A; on the scale B of the slider the value 231 is read; the result is $0.0000231\Omega$.

m. In order to determine the pulsation resonance of an alternating electric current circuit containing an inductance of 200mH and a capacitance of 380 $\mu F$, the procedure is as follows:

On the scale A is set at the division 380 (representing the value of the capacitance) the origin index 1 of the scale B; then the hairline of the slider is set on the division 200 (representing the value of the inductance) of the scale B; then, moving the slider to the left, the division 2 of the basic red inverse scale CI is brought to the hairline of the cursor. At the origin index 1 of the basic scale C the intermediate value 174 is read on the basic scale D, which is set with the hairline of the cursor; moving the slider to the left, that intermediate value 174 on the BF scale is brought to the hairline and into line with the origin index 1 of the scale A, on the scale B the final result of 18.25 periods per second (Hz) is read, which is the resonance pulsation sought.

n. In order to find the axial modulus of resistance to bending $W_z$ of a driving shaft with full circular section having a diameter of $d = 5cm$, the index $W_z$ of the basic scale C is placed on the division 5 of the basic scale D of the body; then the cursor is brought with its hairline on the origin division 1 of the slider, and above, on the cube scale K the result $12.27cm^3$ is read at the hairline.

o. In order to find the necessary diameter of the circular full section corresponding to the known axial modulus of resistance to bending $W_z = 12.27cm^3$, the hairline of the cursor is set on the cube scale K at the division 1227, whereupon the origin index 1 of the slider scale C is brought to the hairline, and, on the basic scale D of the body, at the index $W_z$ the result $d = 5cm$ is read.

p. In order to find the polar resistance modulus $W_p$ of a shaft with a full circular section having a diameter of $d = 3cm$, the division 3 of the basic scale D of the body is set with index $W_p$ of the basic scale C; then the hairline of the cursor is brought over the origin index 1 of the C scale, and above, on the scale K of the cubes, the result $5.3cm^3$ is read on the hairline.

q. In order to find the necessary diameter for the circular full section corresponding to the known polar resistance modulus $W_p = 5.3cm^3$, the division 5.3 is set on scale K, with the hairline of the cursor; then, the origin division 1 of the slider is brought to the hairline, and on the basic scale D of the body, at the index $W_p$ the result $d = 3cm$ is read.

The slide rule for general purposes, provided with the new scale BF of the squares displaced by $\pi$ and with the nes indexes $W_p$ and $W_z$, according to the invention, offers the following advantages of increased efficiency of utilization:

The scale BF, offset by $\pi$, complete or limited to the value of 36 simplifies in a substantial way the calculations with $\pi$, a constant outstandingly frequent in physics, mechanics, machine construction and electrotechnic values; the scale permits simple determination of the perimeter of the circle for a known diameter and vice-versa, simplifies the resolving of relations of the form $\pi d^2$, the calculation of the inductive and capacitive reactance, calculation of the resonance pulsation of alternating electric circuits, and also a large number of transformations and conversions frequent in science and technology.

The indexes $W_z$ and $W_p$ on the basic scale of the slider is interesting for calculations of the resistance of materials, obtaining directly, easily the axial and the polar resistance moduli of the solid circular sections for any given diameter and vice versa, for direct calculation of the diameter when one of these moduli is given as necessary. These new fixed marks are outstandingly useful for calculating sizes when designing all kinds of machines or reinforced-concrete structures with round bars, as well as to check design calculations in these fields.

The slide rule of the invention example brings also a number of other advantages. Thus, placing the exponential scales for $e^X$, $e^{0.1X}$ and $e^{0.01X}$ upon the upper face of the slide rule, precise locating and reading of the scales by means of the semicylindrical magnifying glass of the cursor; this facilitates the extraction of roots of any order, raising a number to any power, either positive or negative, and simplifies direct and precise reading of the result. Also, many superior intricate calculations can be made using the exponential scales combined with the rest of the scales of the obverse face of the slide rule, in order to reduce the great volume of calculations frequent in the field of electrotechnology, chemistry and nuclear physics. The indices CENTE and SEXA on the cursor allow direct reading in centesimal degrees of any angle shown in sexagesimal degrees and vice versa without calculations, combined with the possibilities given by the scale IC of the centesimal trigonometric indices.

I claim:

1. A slide rule having a body provided with a scale face, a slide shiftable relatively to said body and provided with a slide face, and a cursor having a hairline adapted to sweep across said scale faces, a first base-value scale D with the functional notation X subdivided and provided on said scale face, a second base-value scale C with the functional notation X corresponding to the first base-value scale and formed along said slide face, said base-value scales C and D cooperating with said hairline to indicate a value X, a first logarithmically divided square scale A formed on said scale face and indicating the value of $X^2$ for a value X selected by said hairline on said first-value scale, a second logarithmically divided square scale B formed on said slide face and indicating the value $X^2$ for a value X selected by said hairline on said second base-value scale, a folded logarithmically divided square scale BF with a functional notation $\pi X^2$ and having an ocrresponding to the value $\pi$ along with the origins of said first and second square scales and said first and second base-value scales, said folded square scale BF indicating the product $\pi X^2$ for a value X selected by said hairline on said second base-value scale, an index $W_z$ formed on said second base-value scale at the value 2.17 thereof, and an index $W_p$ along said second base-value scale at the value 1.72 thereof, said indices W, and $W_z$ being provided on the slider.

2. The slide rule defined in claim 1 wherein said BF scale is disposed between said B and said C scales for co-operating with said A and D scales.

3. The slide rule defined in claim 2 wherein said BF scale has a length less than the full length of said slider face, said slide rule further comprising a trigonometric centesimal scale in line with said BF scale and extending over at least part of the remainder of the length of said slider face.

4. The slide rule defined in claim 3 wherein said BF scale terminates at a value of approximately 36.

5. The slide rule defined in claim 4, further comprising an L scale formed along said body and decimally subdivided with an origin aligned with the origin of said D scale, a P scale formed along said body and indicating the value $\sqrt{1-X^2}$ for a value X indicated by said hairline on said D scale, a logarithmically divided scale K formed on said body and indicating the value $X^3$ for a value X indicated by said hairline along said D scale and at least one sexagesimal trigonometric scale formed along said slider and indicating a trigonometric function in co-operation with said C and D scales.

6. The slide rule defined in claim 5 wherein said channel has a floor, further comprising at least one scale formed along said floor for indicating efficiency of electric machines and at least one scale along said floor for indicating potential drop.

7. The slide rule defined in claim 6 wherein said scale face is provided with at least one scale representing a value proportional to $e^X$ where X is a value selected by said hairline along the D scale.

8. The slide rule defined in claim 7, further comprising a set of co-operating indices on said A and B scale and on said cursor for facilitating power calculations.

* * * * *